US009762691B2

(12) United States Patent
Brown et al.

(10) Patent No.: US 9,762,691 B2
(45) Date of Patent: *Sep. 12, 2017

(54) POLICY PROXY

(71) Applicant: BlackBerry Limited, Waterloo (CA)

(72) Inventors: Michael Kenneth Brown, Fergus (CA);
Neil Patrick Adams, Waterloo (CA);
Herbert Anthony Little, Waterloo
(CA)

(73) Assignee: BlackBerry Limited, Waterloo, Ontario
(CA)

(*) Notice: Subject to any disclaimer, the term of this patent is extended or adjusted under 35 U.S.C. 154(b) by 0 days.

This patent is subject to a terminal disclaimer.

(21) Appl. No.: 15/375,343

(22) Filed: Dec. 12, 2016

(65) Prior Publication Data
US 2017/0094001 A1    Mar. 30, 2017

Related U.S. Application Data

(63) Continuation of application No. 13/570,709, filed on Aug. 9, 2012, now Pat. No. 9,531,828, which is a
(Continued)

(51) Int. Cl.
H04L 29/10        (2006.01)
H04L 29/08        (2006.01)
(Continued)

(52) U.S. Cl.
CPC .............. *H04L 67/28* (2013.01); *H04W 4/008* (2013.01); *H04W 84/042* (2013.01); *H04W 84/12* (2013.01); *H04W 88/06* (2013.01)

(58) Field of Classification Search
None
See application file for complete search history.

(56) References Cited

U.S. PATENT DOCUMENTS 4,170,998 A * 10/1979 Sauder .................. A61F 7/02
                                                    607/104
5,721,781 A *  2/1998 Deo ..................... G06Q 20/341
                                                    705/67
(Continued)

FOREIGN PATENT DOCUMENTS

EP    1633100    3/2006
EP    2140717    1/2010
(Continued)

OTHER PUBLICATIONS

RFID Tags and Contactless Smart Card Technology: Comparing and Contrasting Applications and Capabilities, Apr. 28, 2005, Apr. 28, 2005.
(Continued)

Primary Examiner — Michael R Vaughan
(74) Attorney, Agent, or Firm — Integral Intellectual Property Inc.; Miriam Paton; Amy Scouten

(57) ABSTRACT

In a system with a policy server, a first device able to communicate with the policy server and a second device able to communicate with the first device and unable to communicate with the policy server, the first device is to act as a policy proxy. The policy server may push to the first device a policy for the second device, and the first device may push the policy to the second device.

16 Claims, 3 Drawing Sheets

Related U.S. Application Data continuation of application No. 12/058,684, filed on Mar. 29, 2008, now Pat. No. 8,261,338, which is a continuation of application No. 11/097,356, filed on Apr. 4, 2005, now Pat. No. 7,356,539.

(51) Int. Cl.
*H04W 4/00* (2009.01)
*H04W 88/06* (2009.01)
*H04W 84/04* (2009.01)
*H04W 84/12* (2009.01)

(56) References Cited

U.S. PATENT DOCUMENTS

| | | | |
|---|---|---|---|
| 6,192,131 B1* | 2/2001 | Geer, Jr. | G06F 21/33 380/247 |
| 6,317,829 B1* | 11/2001 | Van Oorschot | G06Q 20/3672 713/155 |
| 6,345,098 B1* | 2/2002 | Matyas, Jr. | H04L 9/3033 380/46 |
| 6,460,138 B1* | 10/2002 | Morris | G06Q 20/341 713/168 |
| 6,539,093 B1* | 3/2003 | Asad | G06Q 20/3674 380/279 |
| 6,611,863 B1* | 8/2003 | Banginwar | H04L 41/12 709/203 |
| 6,643,751 B2* | 11/2003 | Rosenquist | G06F 21/79 711/163 |
| 6,751,659 B1* | 6/2004 | Fenger | H04L 29/06 709/221 |
| 6,772,225 B1* | 8/2004 | Jennings, III | G06F 17/30902 707/999.006 |
| 6,810,479 B1* | 10/2004 | Barlow | G06Q 20/105 705/66 |
| 6,816,900 B1* | 11/2004 | Vogel | H04L 9/3236 709/203 |
| 6,859,827 B2* | 2/2005 | Banginwar | H04L 41/12 709/203 |
| 6,942,147 B2* | 9/2005 | Lahteenmaki | G06K 7/0008 235/375 |
| 7,016,666 B2* | 3/2006 | Lauper | H04L 63/0823 455/410 |
| 7,035,259 B2* | 4/2006 | Nomura | H04L 45/50 370/254 |
| 7,039,802 B1* | 5/2006 | Eskicioglu | H04L 63/0823 380/255 |
| 7,082,102 B1* | 7/2006 | Wright | H04L 41/0893 370/229 |
| 7,096,204 B1* | 8/2006 | Chen | G06Q 20/02 705/25 |
| 7,096,495 B1* | 8/2006 | Warrier | H04L 63/0263 709/224 |
| 7,114,178 B2* | 9/2006 | Dent | G07C 9/00309 726/3 |
| 7,124,938 B1* | 10/2006 | Marsh | G06F 21/10 235/380 |
| 7,170,998 B2* | 1/2007 | McLintock | G07C 9/00103 340/5.23 |
| 7,213,068 B1* | 5/2007 | Kohli | H04L 41/0604 709/223 |
| 7,243,230 B2* | 7/2007 | England | G06F 21/606 380/201 |
| 7,269,388 B2 | 9/2007 | Poursabahian et al. | |
| 7,290,146 B2* | 10/2007 | Ekers | G06K 19/07716 713/182 |
| 7,296,149 B2* | 11/2007 | Hiltgen | G06F 21/34 380/30 |
| 7,308,706 B2* | 12/2007 | Markham | H04L 63/20 709/227 |
| 7,340,531 B2* | 3/2008 | Rasheed | H04L 67/322 707/999.01 |
| 7,356,539 B2 | 4/2008 | Brown et al. | |
| 7,374,100 B2 | 5/2008 | Jei et al. | |
| 7,490,349 B2 | 2/2009 | Childress et al. | |
| 7,660,803 B2* | 2/2010 | Jin | G06F 17/2247 235/462.01 |
| 7,882,274 B2* | 2/2011 | Peterson | G06F 9/45558 710/10 |
| 7,907,896 B2 | 3/2011 | Chitti | |
| 7,937,704 B2* | 5/2011 | McKee | G06F 9/5066 709/227 |
| 7,954,144 B1* | 5/2011 | Ebrahimi | H04L 63/102 709/227 |
| 8,149,844 B1* | 4/2012 | Roskind | G06F 8/65 370/241 |
| 2001/0019554 A1* | 9/2001 | Nomura | H04L 45/50 370/389 |
| 2001/0019954 A1* | 9/2001 | Lim | H04M 3/365 455/424 |
| 2001/0039576 A1* | 11/2001 | Kanada | H04L 41/0893 709/223 |
| 2002/0026578 A1* | 2/2002 | Hamann | H04L 9/3263 713/159 |
| 2002/0165006 A1* | 11/2002 | Haller | H04L 12/24 455/556.1 |
| 2002/0172177 A1* | 11/2002 | Gooch | H04L 12/2602 370/338 |
| 2003/0041244 A1* | 2/2003 | Buttyan | G06Q 20/20 713/172 |
| 2003/0126236 A1* | 7/2003 | Marl | H04L 29/08846 709/220 |
| 2003/0195957 A1* | 10/2003 | Banginwar | H04L 41/12 709/223 |
| 2003/0217166 A1* | 11/2003 | Dal Canto | H04L 63/0272 709/229 |
| 2004/0064575 A1 | 4/2004 | Rasheed et al. | |
| 2004/0083382 A1 | 4/2004 | Markham et al. | |
| 2004/0260760 A1* | 12/2004 | Curnyn | H04W 88/06 709/201 |
| 2005/0008163 A1* | 1/2005 | Leser | H04L 9/08 380/281 |
| 2005/0015621 A1* | 1/2005 | Ashley | H04L 63/0227 726/4 |
| 2005/0028006 A1* | 2/2005 | Leser | H04L 9/08 726/26 |
| 2005/0039019 A1* | 2/2005 | Delany | H04L 12/58 713/176 |
| 2005/0050363 A1* | 3/2005 | Naka | G06F 21/445 726/4 |
| 2005/0086175 A1* | 4/2005 | Brique | G06Q 20/382 705/64 |
| 2005/0118951 A1* | 6/2005 | Poursabahian | H04L 29/06 455/41.2 |
| 2005/0120106 A1* | 6/2005 | Albertao | G06F 8/65 709/223 |
| 2005/0138387 A1* | 6/2005 | Lam | G06F 21/123 713/185 |
| 2005/0273850 A1* | 12/2005 | Freund | H04L 63/0227 726/14 |
| 2006/0047962 A1* | 3/2006 | Adams | H04L 63/0823 713/175 |
| 2006/0053475 A1* | 3/2006 | Bezilla | G06F 21/552 726/1 |
| 2006/0072456 A1* | 4/2006 | Chari | H04L 41/0893 370/230 |
| 2006/0183462 A1 | 8/2006 | Kolehmainen | |
| 2006/0213982 A1* | 9/2006 | Cannon | G06K 7/0008 235/380 |
| 2006/0218396 A1 | 9/2006 | Laitinen et al. | |
| 2006/0224742 A1* | 10/2006 | Shahbazi | H04L 63/20 709/226 |
| 2006/0224901 A1 | 10/2006 | Lowe | |
| 2006/0225123 A1* | 10/2006 | Childress | G06F 21/105 726/1 |
| 2006/0236117 A1* | 10/2006 | Lazaridis | G06K 7/01 713/185 |
| 2006/0286969 A1 | 12/2006 | Talmor et al. | |

(56) References Cited

U.S. PATENT DOCUMENTS

| | | | |
|---|---|---|---|
| 2007/0057057 A1* | 3/2007 | Andresky | G06K 7/0008 235/451 |
| 2007/0180499 A1 | 8/2007 | Van Bemmel | |
| 2007/0192610 A1* | 8/2007 | Chun | G06F 21/64 713/176 |
| 2007/0300059 A1* | 12/2007 | Yoneda | G06Q 20/02 713/156 |
| 2008/0046739 A1* | 2/2008 | Adams | G06F 21/335 713/176 |
| 2009/0067419 A1* | 3/2009 | Araki | H04L 12/5691 370/389 |
| 2009/0093247 A1 | 4/2009 | Srinivasan | |
| 2009/0158032 A1 | 6/2009 | Costa et al. | |
| 2009/0199001 A1 | 8/2009 | Barriga et al. | |
| 2010/0077466 A1 | 3/2010 | Lowe | |
| 2011/0167470 A1* | 7/2011 | Walker | H04L 67/1095 726/1 |

FOREIGN PATENT DOCUMENTS

| | | |
|---|---|---|
| WO | 0127821 | 4/2001 |
| WO | 03028313 | 4/2003 |
| WO | 2005048524 | 5/2005 |
| WO | 2005106618 | 11/2005 |

OTHER PUBLICATIONS

"HID Virtual Products—idBank", retrieved from http://www.hidglobal.com/page.php?page_id=174, on May 11, 2008.
Technology Basics White Paper, "How an HID Card is "Read"", 2005.
"Smart Cards for Access Control Advantages and Technology Choices", Smart Cards for Access Control Advantages and Technology Choices, published 2005, 2005.
Atkinson, Third Office Action for CA2738157 Feb. 3, 2016.
Beatty, Second Examination Report for EP 06119048.4, Mar. 18, 2009.
Beatty, Third Exam Report for EP 06119048.4, Mar. 16, 2011.
Beatty, "EESR", Extended European Search Report for EP 06119048.4, Dec. 28, 2006.
Chan, et al., "COPS Usage for Policy Provisioning (COPS-PR)", Mar. 2001.
Ekberg, et al., "Nokia Research Center, On-board Credentials with Open Provisioning", Aug. 29, 2008.
Gai, et al., "QoS Policy Framework Architecture", IETF Standard-working-draft, Internet Engineering Task Force, IETF, CH, Feb. 10, 1999, Feb. 10, 1999, 1-16.
Ghayour, Second Office Action for CA 2,593,977, May 31, 2012.
Ghotra, et al., "Secure Display and Secure Transactions Using a Handset", IEEE, Sixth International Conference on the Management of Mobile Business (ICMB 2007).
Holmes, First Office Action for U.S. Appl. No. 13/093,898, Sep. 13, 2013.
Holmes, Notice of Allowance for U.S. Appl. No. 13/093,898, Apr. 23, 2014.
Holmes, Second Office Action for U.S. Appl. No. 13/093,898, Feb. 14, 2014.
IBM, "Tivoli Access Manager, Base Installation Guide, version 5.1", Nov. 2003.
Mian, First Office Action for CA 2,539,998, May 14, 2010.
Nakra, First Office Action for CA 2,787,977, Mar. 31, 2014.
Nakra, Second Office Action for CA2787977 May 28, 2015.
Oliveira, Extended European Search Report for EP 11163667.6, Mar. 7, 2014.
Oliveira, First Exam Report for EP11163667.6 Nov. 11, 2015.
Othman, et al., "Forming Virtualized Secure Framework for Location Based Services (LBS) using Direct Anonymous Attestation (DAA) protocol", IEEE, Second International Workshop on Network Assurance and Security Services in Ubiquitous Environments, 2010.
Phanse, et al., "Design and demonstration of policy-based management in s multy-hop ad hoc network", AD HOC Networks, Elsevier, vol. 3, No. 3 Nov. 29, 2003 pp. 389-401, Nov. 29, 2003, 1-16.
Rosken, Examination Report for EP 05102623.5, Nov. 22, 2006.
Rosken, "EESR", Extended European Search Report for EP 05102623.5, Oct. 5, 2005.
Shaw, Advisory action for U.S. Appl. No. 11/464,900, Dec. 9, 2010.
Shaw, Fifth Office Action for U.S. Appl. No. 11/464,900, Jul. 18, 2011.
Shaw, First Office Action for U.S. Appl. No. 11/464,900, Feb. 5, 2010.
Shaw, Fourth Office Action for U.S. Appl. No. 11/464,900, Jan. 25, 2011.
Shaw, Second Office Action for U.S. Appl. No. 11/464,900, Jul. 20, 2010.
Shaw, Sixth Office Action for U.S. Appl. No. 11/464,900, Jan. 9, 2012.
Shreih, First Office Action for CA 2,593,977, Oct. 7, 2010.
Siddiqui, First Office Action for CA 2,738,157, Dec. 16, 2013.
Siddiqui, Second Office Action for CA2738157, Oct. 7, 2014.
Smart Card Alliance, Using Smart Cards for Secure Physical Access, published Jul. 2003, publication No. ID-03003, Jul. 2003.
Wang, Third Office Action CA2,593,977 Jan. 9, 2014.

* cited by examiner

POLICY PROXY

BACKGROUND OF THE INVENTION

In an organization, an Information Technology (IT) administrator may create IT policies to control the electronic devices in the organization, such as computers, laptops, cellphone, personal digital assistants, printers, and the like. A policy server may store the various IT policies, and may push the relevant IT policy directly to the devices in the organization. Alternatively, the devices may contact the policy server directly to obtain their IT policy.

The organization may include electronic devices that are unable to connect to the policy server. The IT administrator may manually configure each such electronic device according to the established IT policy. However, this is time-consuming and may lead to errors if the manual configuration does not match the intended policy. Moreover, some electronic devices may not include a user interface that is suitable for enabling configuration according to an IT policy.

The IT administrator may also develop IT policies for electronic devices that do not belong to the organization but that communicate with a device that does belong to the organization, or have installed thereon software for use with devices that belong to the organization. Since these devices do not belong to the organization, they may be unable to connect to the policy server and the IT administrator may not have any physical access to them.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
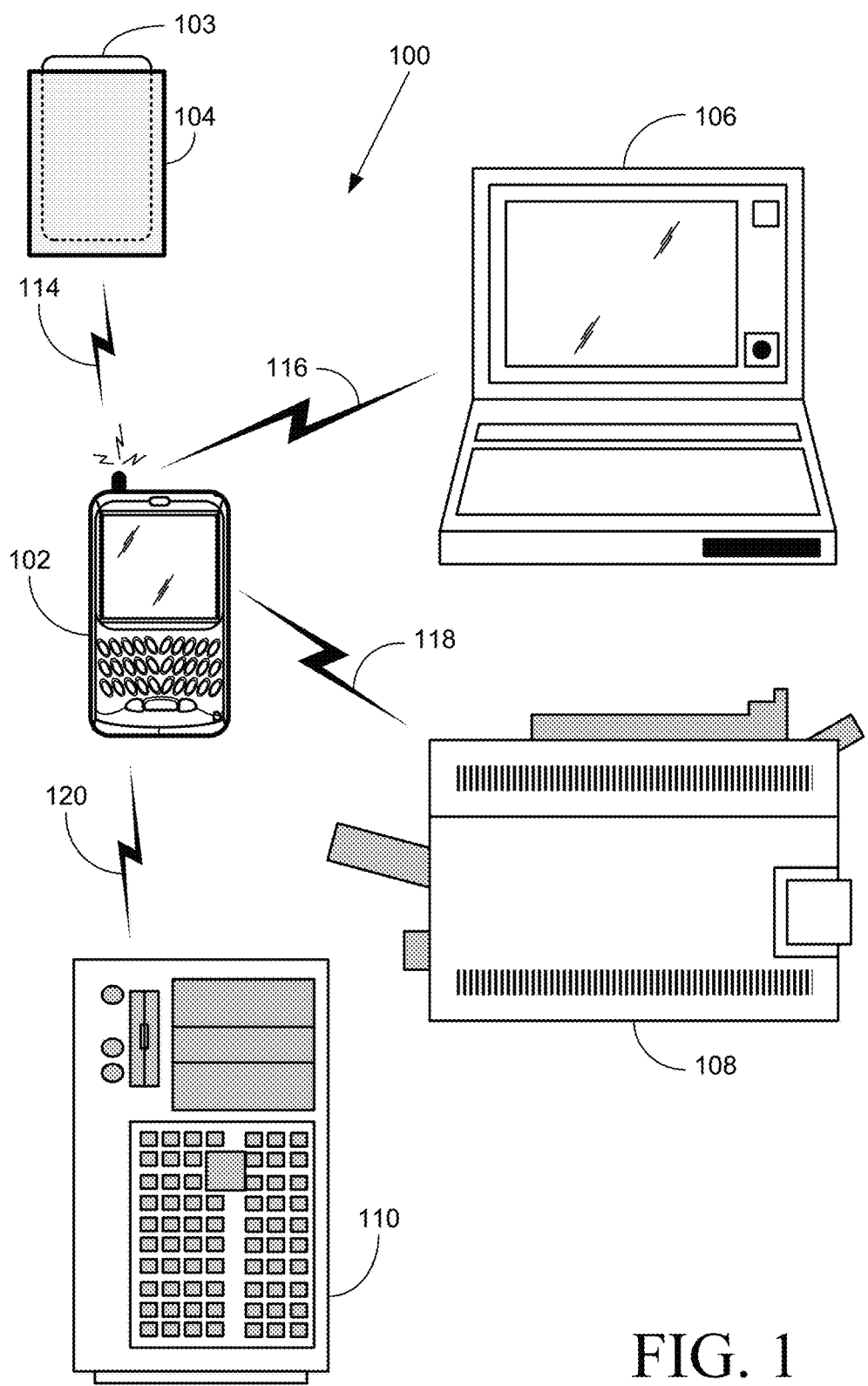
FIG. 1 is a schematic diagram of an exemplary system, according to some embodiments of the invention.

FIG. 1 is a schematic diagram of an exemplary system, according to some embodiments of the invention. A system 100 includes a device 102 and a policy server 110. An IT administrator may store one or more policies on policy server 110. One or more of the policies stored on policy server 110 may apply to device 102, and policy server 110 may push the one or more policies that apply to device 102 over a communication link 120. Device 102 may contact policy server 110 over communication link 120 to request the one or more policies that apply to device 102.

System 100 may also include other devices for which the IT administrator has stored policies on policy server 110. For example, these other devices may include a smart card reader 104, a personal computer 106, and a printer 108, which may be able to communicate with device 102 over communication links 114, 116 and 118, respectively. A smart card 103 is shown inserted into smart card reader 104. Smart card reader 104 and printer 108 may be considered peripherals of device 102, and one or more software applications for use with device 102 may be installed on personal computer 106.

Device 102 may be a mobile device, and communication link 120 may include a segment that is a wireless communication link. For example, communication link 120 may include a cellular telephony link. A non-exhaustive list of examples of cellular telephony standards for the cellular telephony link includes Direct Sequence-Code Division Multiple Access (DS-CDMA), Global System for Mobile Communications (GSM), North American Digital Cellular (NADC), Time Division Multiple Access (TDMA), Extended-TDMA (E-TDMA), wideband CDMA (WCDMA), General Packet Radio Service (GPRS), Enhanced Data for GSM Evolution (EDGE), 3.5G and 4G. In another example, communication link 120 may include a wireless local area network link. A non-exhaustive list of examples of wireless local area network standards for the wireless local area network link includes the Institute of Electrical and Electronic Engineers (IEEE) for Wireless LAN MAC and Physical layer (PHY) 802.11 a, b, g and n specifications or future related standards, the Bluetooth® standard, the Zigbee™ standard and the like.

Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an authentication certificate, and may include a decryption engine, e.g., a processor and/or dedicated decryption logic. A smart card may include a connector for powering the semiconductor device and performing serial communication with an external device. Alternatively, smart card functionality may be embedded in a device having a different form factor and different communication protocol, for example a Universal Serial Bus (USB) device.

The person whose security information is stored on smart card 103 may use smart card reader 104 for identification and to digitally sign and/or decrypt messages sent by device 102. Smart card reader 104 may communicate with device 102 over a wireless communication link 114, for example, a Bluetooth® communication link.

A non-exhaustive list of examples of what an IT policy for smart card reader 104 may include is a) under what circumstances confidential information stored at smart card reader 104 is deleted, b) with which devices smart card reader 104 is allowed to communicate, c) the number of incorrect smart card login attempts before smart card reader 104 is locked, and d) which algorithms smart card reader 104 is allowed to use to protect wireless communication link 114. However, smart card reader 104 may lack a user interface that is suitable for configuring this policy in smart card reader 104. Also, smart card reader 104 may be unable to communicate with policy server 110. Policy server 110 may communicate a policy for smart card reader 104 to device 102, and device 102 may communicate the policy to smart card reader 104.

Printer 108 may be a local printer that communicates with device 102 over wireless communication link 118, for example, a Bluetooth® communication link. A non-exhaustive list of examples of what an IT policy for printer 108 may include is a) font or template information on how to print out forms of the organization, b) printer resolution (e.g., dots per inch), and c) which devices printer 108 is allowed to connect to. Printer 108 may be unable to communicate with policy server 110. Policy server 110 may communicate a policy for printer 108 to device 102, and device 102 may communicate the policy to printer 108.

Personal computer 106 may be a home computer of a person who belongs to the organization, and may have a software application installed thereon for use with device 102. An IT policy for personal computer 106 may, for example, affect how the software application operates. Policy server 110 may communicate a policy for personal computer 106 to device 102, and device 102 may communicate the policy to personal computer 106.

In general, policy server 110 may communicate to device 102 a policy for another device that is able to communicate with device 102 and unable to communicate with policy server 110, and device 102 may communicate the policy to the other device. Device 102 may contact policy server 110 over communication link 120 to request one or more policies for the other device. Device 102 may collect information regarding which other devices it is communicating with and may report that information to policy server 110. Device 102 may also send a confirmation back to policy server 110 once a policy received at device 102 and communicated to another device is applied at the other device.

Figure 2:
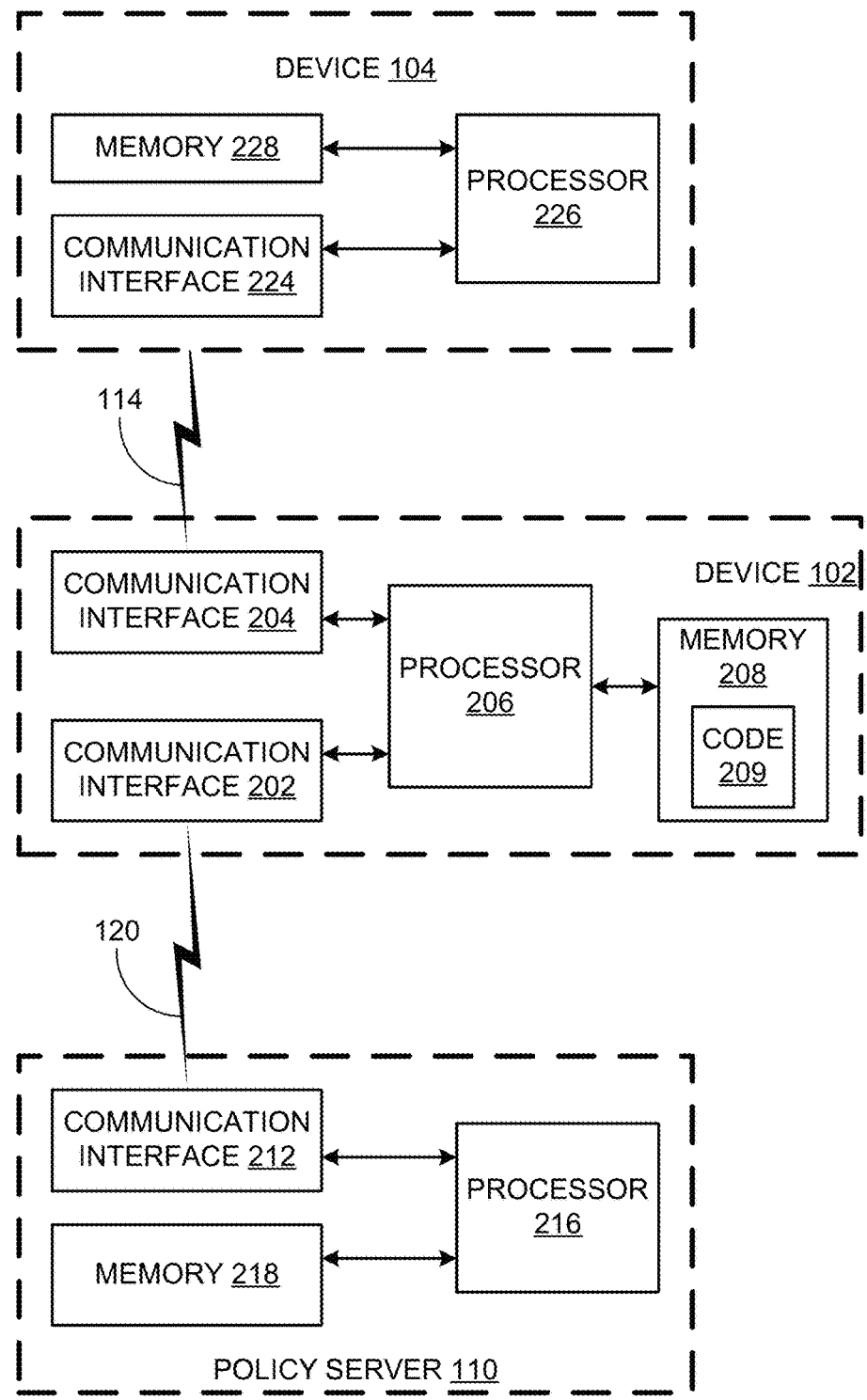
FIG. 2 is a block diagram of some component of the exemplary system of FIG. 1, according to some embodiments of the invention.

FIG. 2 is an exemplary block diagram of policy server 110, device 102 and device 104, according to some embodiments of the invention.

Device 102 may include a communication interface 202 through which device 102 is able to receive a policy from policy server 110. Device 102 may also include a communication interface 204 through which device 102 is able to transmit all or a portion of the policy to device 104. Communication interface 202 may be compatible, for example, with a wireless local area network standard or with a cellular telephony standard. Communication interface 204 may be compatible, for example, with the Bluetooth® standard.

Device 102 may also include a processor 206 coupled to communication interface 202 and to communication interface 204. Device 102 may also include a memory 208, coupled to processor 206. Memory 208 may store executable code 209 to be executed by processor 206. Memory 208 is able to store one or more policies received from policy server 110.

Policy server 110 may include a communication interface 212, a processor 216 coupled to communication interface 212, and a memory 218 coupled to processor 216. Memory 218 is able to store IT policies.

Device 104 may include a communication interface 224, a processor 226 coupled to communication interface 224, and a memory 228 coupled to processor 226. Memory 228 is able to store one or more policies received from device 102. Communication interface 224 may be compatible with the same standard as communication interface 204.

Figure 3:
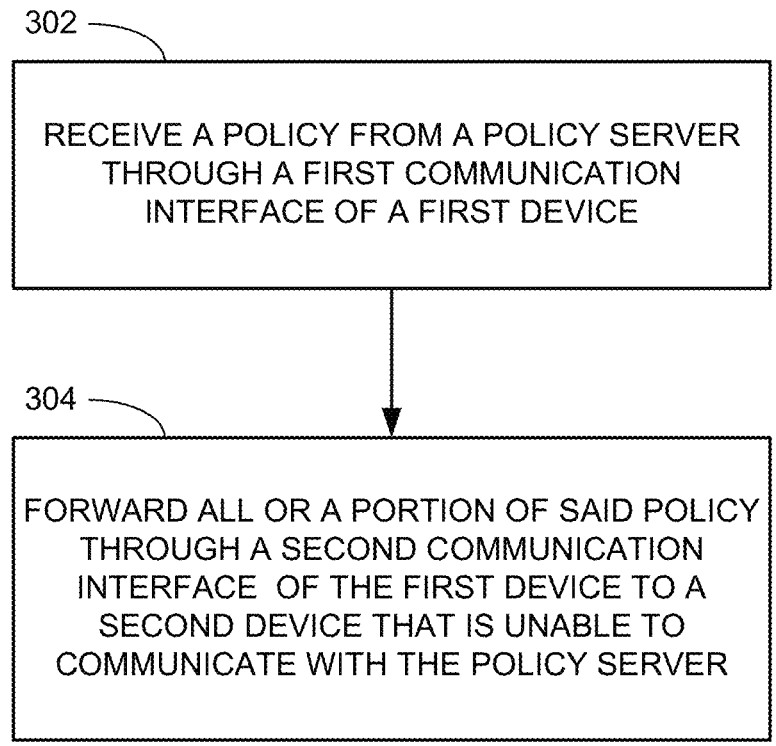
FIG. 3 a flowchart of an exemplary method, according to some embodiments of the invention.

FIG. 3 is a flowchart of an exemplary method to be implemented by device 102, according to some embodiments of the invention. Executable code 209, when executed by processor 210, may cause device 102 to implement the method of FIG. 3.

At 302, device 102 receives a policy from policy server 110 through communication interface 202 over communication link 120. At 304, device 102 transmits all or a portion of the policy through communication interface 204 to another device that is unable to communicate with policy server 110.

A non-exhaustive list of examples for device 102 includes a cellular phone, a personal digital assistant (PDA), an electronic mail (Email) client, a gaming device, a laptop computer, a notebook computer, a desktop computer, a server computer, and any other suitable apparatus.

A non-exhaustive list of examples for processors 206, 216 and 226 includes a central processing unit (CPU), a digital signal processor (DSP), a reduced instruction set computer (RISC), a complex instruction set computer (CISC) and the like.

Memories 208, 218 and 228 may be fixed in or removable from device 102, policy server 110 and device 104, respectively. A non-exhaustive list of examples for memories 208, 218 and 228 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Processors 206, 216 and 226, and memories 208, 218 and 228 are functional blocks and may be implemented in any physical way in device 102, policy server 110 and device 104, respectively. For example, processor 206 and memory 208 may each be implemented in a separate integrated circuit, and optionally in additional discrete components. Alternatively, some of the functional blocks may be grouped in one integrated circuit. Furthermore, the functional blocks may be parts of application specific integrated circuits (ASIC), field programmable gate arrays (FPGA) or application specific standard products (ASSP).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A non-transitory computer-readable medium comprising computer-executable code for execution by a processor of a first device, the first device comprising a first communication interface through which the first device is able to communicate with a policy server and a second communication interface through which the first device is able to communicate with other devices that are unable to communicate with the policy server, wherein execution of the code causes the first device:

to collect information regarding those of the other devices with which the first device is communicating;

to report the information to the policy server;

to contact the policy server to request a policy for at least one of the other devices;

to receive from the policy server a policy for the at least one of the other devices; and to send all or a portion of the policy to the at least one of the other devices.

2. The non-transitory computer-readable medium of claim 1, wherein the first communication interface is compatible with a first wireless communication standard and the second communication interface is compatible with a second, different wireless communication standard.

3. The non-transitory computer-readable medium of claim 2, wherein the first communication standard is a wireless local area network standard.

4. The non-transitory computer-readable medium of claim 2, wherein the first communication standard is a cellular telephony standard.

5. The non-transitory computer-readable medium of claim 2, wherein the second communication standard is the Bluetooth® standard.

6. A non-transitory computer-readable medium comprising computer-executable code for execution by a processor of a first device, the first device comprising a first communication interface through which the first device is able to communicate with a policy server over a first communication link and a second communication interface through which the first device is able to communicate with a second device over a second communication link, wherein execution of the code causes the first device:

to receive information associated with the second device;

to send at least part of the information to the policy server;

to send to the policy server, over the first communication link, a request for a policy for the second device, wherein the second device has a software application for use with the first device and the policy affects how the software application operates;

to receive from the policy server, over the first communication link, the policy for the second device; and to send the policy to the second device, over the second communication link, wherein the second device is not in direct communication with the policy server.

7. The non-transitory computer-readable medium of claim 6, wherein the first device is a mobile electronic device.

8. The non-transitory computer-readable medium of claim 7, wherein the second communication link comprises a wireless communication link.

9. The non-transitory computer-readable medium of claim 8, wherein the wireless communication link is a wireless local area network link.

10. The non-transitory computer-readable medium of claim 9, wherein the wireless local area network link is a Wireless Local Area Network (WLAN) network compliant with at least one of an IEEE 802.11b standard, an IEEE 802.11n standard, an IEEE 802.11a standard, an IEEE 802.11 g standard, a Zigbee standard, and a Bluetooth® standard.

11. The non-transitory computer-readable medium of claim 7, wherein at least a segment of the first communication link is a wireless communication link.

12. The non-transitory computer-readable medium of claim 11, wherein the wireless communication link comprises one of a Global System for Mobile Communications GSM network, a General Packet Radio Service GPRS network, an Enhanced Data Rates for Global System for Mobile Communications GSM Evolution EDGE network, a Code Division Multiple Access CDMA network, a wideband CDMA network, a 3.5G network and a 4G network.

13. The non-transitory computer-readable medium of claim 6, wherein the policy defines under what circumstances confidential information stored at the second device is deleted.

14. The non-transitory computer-readable medium of claim 6, wherein the policy defines with which devices the second device is allowed to communicate.

15. The non-transitory computer-readable medium of claim 6, wherein execution of the code further causes the first device to send only a portion of the policy to the second device.

16. The non-transitory computer-readable medium of claim 6, wherein execution of the code further causes the first device to push the policy to the second device.

* * * * *